(12) United States Patent
Chen

(10) Patent No.: US 6,695,481 B1
(45) Date of Patent: *Feb. 24, 2004

(54) LOCKING DEVICE AND ITS RELATED ASSEMBLAGE

(75) Inventor: Lee-Long Chen, Taoyuan Hsein (TW)

(73) Assignee: Delta Electronics, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/704,405

(22) Filed: Nov. 2, 2000

Related U.S. Application Data

(63) Continuation of application No. 09/186,600, filed on Nov. 5, 1998, now Pat. No. 6,276,833, which is a continuation-in-part of application No. 08/902,646, filed on Jul. 30, 1997, now Pat. No. 5,863,134.

(51) Int. Cl.[7] ................................................ F06C 35/02
(52) U.S. Cl. ........................ 384/226; 384/428; 384/903; 403/326; 411/526
(58) Field of Search ................................ 384/226, 428, 384/903, 114, 115, 119, 120, 107, 108, 111, 113, 227–246, 275, 276, 295, 296, 440; 403/52, 57, 71, 120, 132, 326–328; 411/526, 517, 518, 519, 525, 527

(56) References Cited

U.S. PATENT DOCUMENTS

| | | | |
|---|---|---|---|
| 3,121,583 A | * 2/1964 | Damm | 403/326 |
| 3,276,676 A | 10/1966 | Buske | 384/100 X |
| 3,494,674 A | 2/1970 | Muijderman et al. | 384/113 |
| 3,604,770 A | 9/1971 | Peltier | 384/286 |
| 3,663,849 A | * 5/1972 | Hoeb | 310/90 |
| 3,726,575 A | * 4/1973 | Moorman | 308/135 |
| 3,893,221 A | * 7/1975 | Lehmann | 411/526 |
| 4,302,060 A | 11/1981 | Nicholas et al. | 384/111 |
| 4,737,673 A | * 4/1988 | Wrobel | 384/295 X |
| 4,747,705 A | 5/1988 | Agrawal | 384/118 |
| 4,822,228 A | * 4/1989 | Senft et al. | 411/519 |
| 4,968,910 A | * 11/1990 | Meier et al. | 384/903 X |
| 5,195,860 A | * 3/1993 | Steyn | 411/526 |
| 5,270,737 A | 12/1993 | Nagasugi et al. | 346/108 |
| 5,390,397 A | * 2/1995 | Kremer et al. | 411/517 X |
| 5,444,603 A | * 8/1995 | Otsuka et al. | 411/526 X |
| 5,562,347 A | * 10/1996 | Hsieh | 384/296 X |

* cited by examiner

Primary Examiner—Thomas R. Hannon
(74) Attorney, Agent, or Firm—Myron Greenspan, Esq.; Lackenbach Siegel LLP

(57) ABSTRACT

A locking device and its assemblage are provided for confining an object. The locking device is used to confine the object having an end having a recess having a defining surface to prevent the object from being displaced in a direction. The locking device is a geometrically closed-loop body having a hollow portion, and has a flexibility so that upon being applied with an external force, the object will pass through the hollow portion and the end will thus be confined by the locking device while the force disappears. A simple process can be used to assemble and disassemble the locking assemblage.

6 Claims, 2 Drawing Sheets

# US 6,695,481 B1

LOCKING DEVICE AND ITS RELATED ASSEMBLAGE

CROSS-REFERENCES TO PRIOR APPLICATIONS

This is a continuation of prior application Ser. No. 09/186,600 filed Nov. 5, 1998, now U.S. Pat. No. 6,276,833 a continuation-in-part application of U.S. patent application Ser. No. 08/902,646, filed on Jul. 30, 1997, now U.S. Pat. No. 5,863,134.

BACKGROUND OF THE INVENTION

1. Field of the Invention

The present invention relates to a locking device and its related assemblage, and more particularly to a retaining ring for confining a shaft of a motor to prevent the shaft from being displaced in a direction.

2. Description of the Prior Art

Motor is widely used in many field such as CD-ROM or DC motor. In general, a shaft of motor is confined by a retaining ring to prevent the shaft from being displaced in an axial direction. FIG. 1A is a sectional view of the traditional assemblage for confining a shaft of the motor. The assemblage includes a bushing 12, a bearing 11, a shaft 10, and a retaining ring 13. A bushing cover 15 with an external screw thread is disposed in the bottom of bushing 12. The bushing 12 is used to accommodate therein the bearing 11, the shaft 10, and the retaining ring 13. A washer 14 supporting the shaft 10 is disposed on the [bottom of] bushing cover 15. FIG. 1B is a top view of the retaining ring 13 which is an annular plate structure having a gap 131. Because the retaining ring 13 has the gap 131 and a flexibility, the retaining ring 13 must be opened by an external force, thereby an end 103 of the shaft 10 will pass through a hollow portion of the retaining ring 13 and a recess 101 of the shaft 10 will be confined by the retaining ring 13 while the end 102 passes through the hollow portion. The shaft 10 is tightly fastened by the retaining ring 13.

However, such a retaining ring still brings about the inconvenience of the assembling process and thus it is desired to modify the design of the retaining ring. The altitude of the shaft is adjusted by the bushing cover 15. If the bushing cover is not closed hermetically, leakage of the lubricant will happen. Furthermore, the altitude of the shaft cannot be easily controlled.

Therefore, the present invention provides a practical device and its relative assemblage for obviating the disadvantages of the prior art as described above.

SUMMARY OF THE INVENTION

An object of the present invention is to provide a practical locking device and its relative assemblage for confining an object to prevent the object from being displaced in a direct.

According to the present invention, a locking device for confining the object having an end having a recess having a defining surface to prevent the object from being displaced in a direction, is a geometrically closed-loop body having a hollow portion, and has a flexibility that upon being applied with an external, the object will pass through the hollow portion free from contact with the object and in the end will thus be confined by the locking device while the force disappears.

In accordance with an aspect of the present invention, the hollow portion has a defining periphery including at least one convex zone spaced from the defining surface of the recess with a first distance while the object is locked by the locking device, and at least one concave zone spaced from the defining surface of the recess with a second distance while the object is locked by the locking device. The first distance is shorter than the second distance. Preferably, the number of the convex zone is two or three.

In accordance with another aspect of the present invention, the object is an elongate body having the end and the elongate body is a shaft.

In accordance with another aspect of the present invention, the direction is an axial direction of the shaft.

In accordance with another aspect of the present invention, the end of the object is suitably curved so as to pass through said hollow portion.

In accordance with another aspect of the present invention, the geometrically closed-loop body is a plate structure which is a retaining ring.

In addition, the present invention also provides a locking assemblage which includes an object having an end having a recess having a defining surface, a locking device confining the end of the object, and an integral holder accommodating therein the locking device and the end of the object.

In accordance with another aspect of the present invention, the integral holder includes a holding body having a first chamber and a second chamber, the first chamber accommodating the end of the object, the second chamber accommodating the locking device.

In accordance with another aspect of the present invention, the first chamber and second chamber communicate with each other.

In accordance with another aspect of the present invention, the first chamber has a closed end and the second chamber has an open end.

In accordance with another aspect of the present invention, the recess is an annular groove around the end of a shaft.

In another preferred embodiment of the present invention, a locking assemblage includes an object having an end having a recess therein, a locking device for confining an object having an end having a recess having a defining surface to prevent said object from being displaced in a direction, and a holder accommodating therein the locking device and the end of the object.

In accordance with another aspect of the present invention the locking device is a geometrically closed-loop body having a hollow portion, and has a flexibility that upon being applied with an external force, the object will pass through the hollow portion and the end will thus be confined by the locking device, and a concave zone spaced from the defining surface of the recess with a afirst distance while the object is locked by the locking device, and a concave zone spaced from the defining surface of the recess with a second distance while the object is locked by the locking device.

In accordance with another aspect of the present invention, the end of the object is so curved so as to pass through the hollow portion.

In addition, the present invention also provides a holder which includes an elongate holding body having a first end, a second end, and a chamber to accommodate an end of an object and a locking device therein in which the object is free from contact with the locking device, a first end part integrally formed to the first end and being closed, a second end part formed on the second end and being open to enable the end of the object and the locking device to pass therethrough, and an internal wall integrally formed to the elongate holding body forming the chamber, wherein the chamber has a stepped surface to thereby form a relatively small chamber accommodating therein the end of the object and a relatively large chamber accommodating therein the locking device.

In accordance with another aspect of the present invention, the holder further accommodates therein a washer to support thereon said shaft.

In accordance with another aspect of the present invention, the holder further accommodates therein a bearing which regulates the shaft to spin therein.

In accordance with another aspect of the present invention, the locking device is a retaining ring.

In accordance with another aspect of the present invention, the first end part and second end part are cylindrical.

In accordance with another aspect of the present invention, the elongate holding body is a bushing.

BRIEF DESCRIPTION OF THE DRAWINGS

The present invention may best be understood through the following description with reference to the accompanying drawings in which.

DETAILED DESCRIPTION OF THE PREFERRED EMBODIMENTS

The present invention provides a locking device and its related assemblage. The locking device is used to confine an object having an end having a recess to prevent the object from being displaced in a direction. The locking device is a plate structure having a hollow portion, and has flexibility so that upon being applied with an external force, the end of the object will pass through the hollow portion and the end will thus be confined by the locking device while the force disappears. The hollow portion has a defining periphery including at least one convex zone, each of which is spaced from the surface of the recess by a first distance while the object is locked by the locking device, and at least one concave zone, each of which is spaced from the surface of the recess by a second distance while the object is locked by the locking device. The first distance is shorter than the second distance. The locking assemblage includes an object having a recess, a locking device confining the recess, and an integral holder accommodating therein the object and the locking device.

Figure 1A:
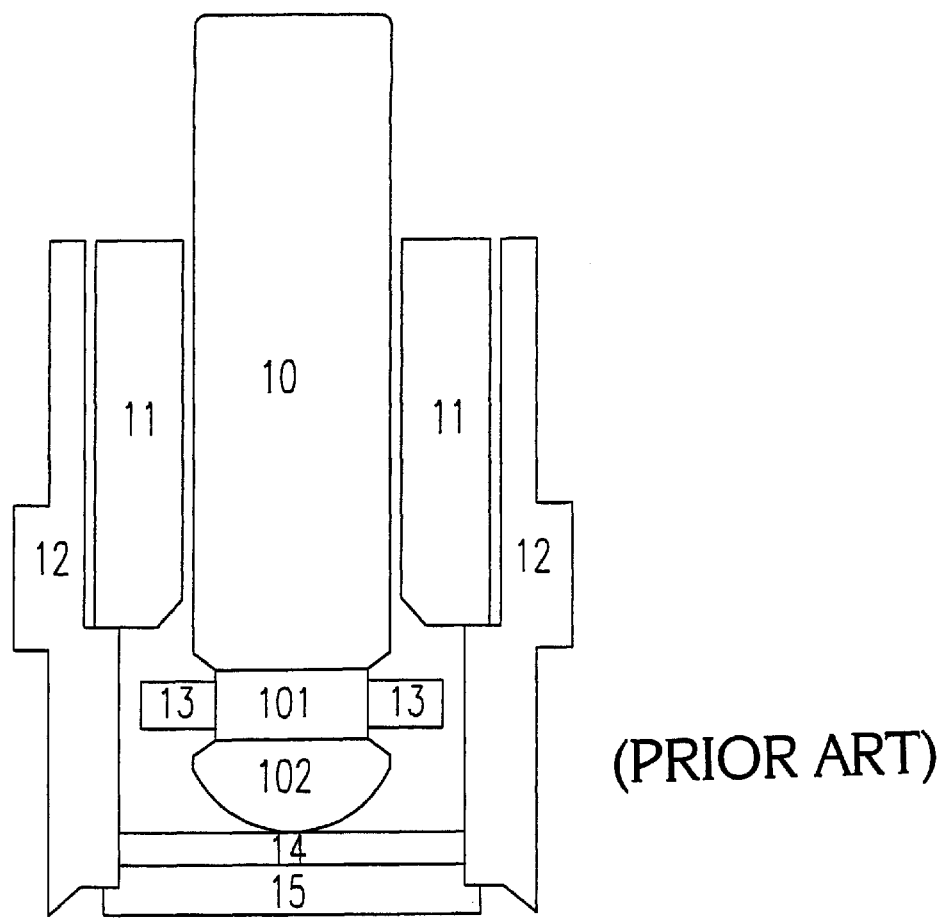
FIG. 1A is a longitudinally section view of a conventional locking assemblage for confining the shaft of the motor.
Figure 1B:
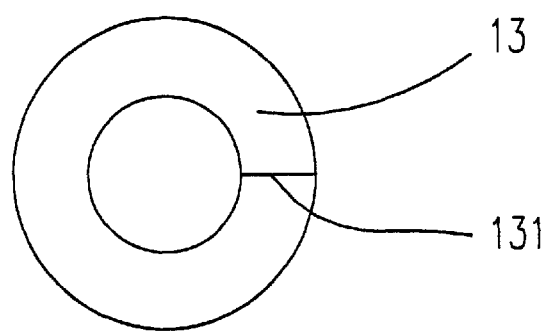
FIG. 1B is a top view of the conventional retaining time.
Figure 2A:
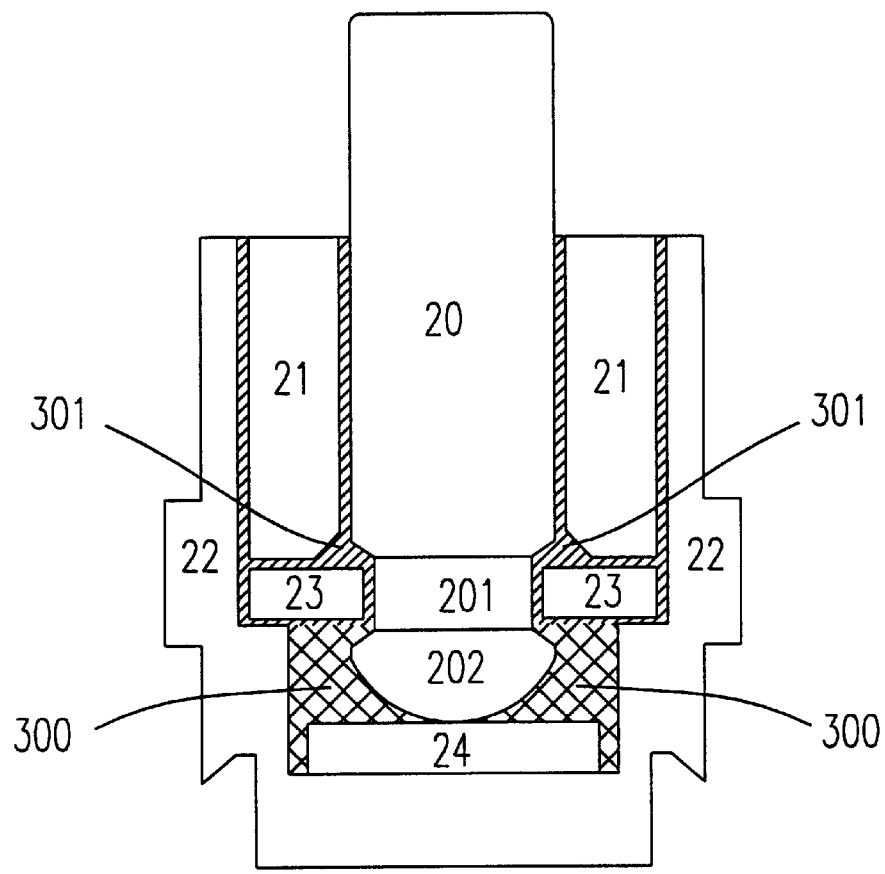
FIG. 2A is a sectional view of the preferred embodiment of a locking assemblage according to the present invention.

The preferred embodiment of the present invention, as shown in FIG. 2A, is a locking assemblage. A retaining ring 23 is used to confine the shaft 20 having an axis and an end 202 having a recess 201 to prevent the shaft 20 from being displaced in the axial direction. The retaining rind 23 is a plate structure having a hollow portion or opening, and has flexibility that upon being applied with an external force, the shaft 20 will pass through the hollow portion and the end 202 will thus be confined by the retaining ring 23 while the force disappears. The end 202 of the shaft has a curved surface so as to pass through the hollow portion. The receive 201 has a defining surface in the end 202 of the shaft 20. The recess 201 is an annular groove around the end 202 of the shaft 20 which does not contact the retaining ring 23 when the shaft is spinning.

Figure 2B:
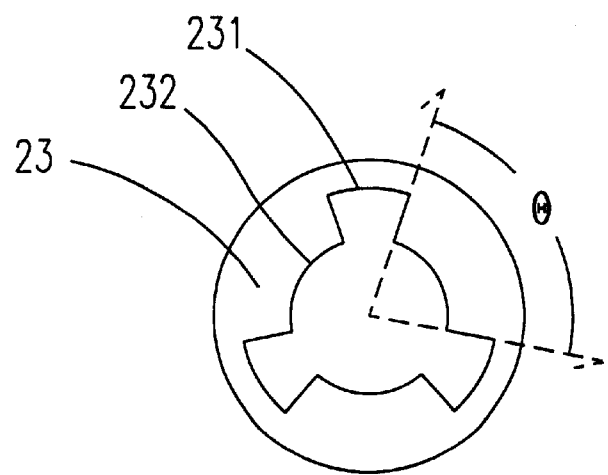
FIG. 2B is a top view of the preferred embodiment of a locking device according to the present invention.

FIG. 2B shows that the hollow portion has a defining periphery including three convex portions or zones 232, each of which is spaced from the defining surface of the recess 201 by a first distance while the shaft 20 is locked by the retaining ring 23, and three concave zones or portions 231, each of which is spaced from the defining surface of the recess 201 by a second distance while the shaft 20 is locked by the retaining ring 23. The first distance is shorter than the second distance.

Referring to FIG. 2A again, the locking assemblage includes a shaft 20 having an end 202 having a recess 201, a retaining ring 23 confining the shaft 20, and an integral bushing 22 accommodating the end 202 of the shaft 20 and the retaining ring 23 therein. The bushing 22 having an integral body has a first chamber 300 and a second chamber 301. The first chamber 300, which further accommodates the washer 24 supporting the shaft 20, has a closed end. The second chamber 301 has an open end and accommodates the bearing 21 which regulates the shaft 20 to spin therein. The first chamber 300 and the second chamber 301 communicate with each other. A stepped surface formed inside the bushing 22 is used to divide the internal space of bushing 22 into a relatively small chamber and a relatively large chamber. The relatively small chamber is the first chamber 300, and the relatively large chamber is the second chamber 301.

The present invention provides a simple process to assemble a locking device with the shaft of a motor. Firstly, the washer 24 is placed on the bottom of the first chamber 300 of the bushing 22. Secondly, the retaining ring 23 is put on the bottom of the second chamber 301. Thirdly, the bearing 21 is pressed into the second chamber 301. Finally, the shaft 20 is inserted into the central space of the bearing 21. An external force is applied upon the shaft 20 so as to enable the shaft 20 to pass through the hollow portion of the retaining ring. The end 202 will thus be confined by the retaining ring 23 while the external force disappears. The locking assemblage aids in avoiding leakage of oil and provides a more precise altitude of the shaft 20.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A locking device for use with a shaft-like body, comprising:

a shaft-like body having a recess portion at one end thereof arranged to rotate about a predetermined axis; and a flexible retaining body of a flat plate and closed loop structure with an opening therein substantially concentric with said axis for directly receiving and passing said shaft-like body through said opening and retaining said recess portion on the shaft-like body therein, wherein said opening has a defining periphery which includes alternate portions of said flat plate that are more radially inward and radially outward in relation to said axis of the shaft-like body, at least some of said portions are temporarily deformable during axial insertion of the shaft-like body through said opening, and wherein said opening defines a space allowing the recess portion to be retained therein again displacements of the shaft-like body along a direction substantially parallel to said predetermined axis without contact with said flexible retaining body.

2. The locking device of claim 1, wherein said end of said shaft is curved so as to facilitate said shaft to pass through said hollow portion.

3. The locking device of claim 1, wherein said flexible retaining body of said flat plate and closed loop structure is retaining ring.

4. The locking device of claim 1, wherein said defining periphery of said hollow portion includes three pairs of convex and concave zones.

5. The locking device of claim 1, wherein said recess portion is an annular groove around said end of said shaft.

6. The locking device of claim 1, wherein said shaft passes through said hollow portion when an external force is exerted on said shaft, and said recess portion of said shaft is retained in said hollow portion when said external force is removed.

* * * * *